Nov. 6, 1962 P. E. PRITCHARD 3,062,925

PHONOGRAPH PICKUP CARTRIDGE AND REPLACEABLE STYLUS THEREFOR

Filed May 2, 1960

Inventor:
Peter Ernest Pritchard,
by Norman C. Fulmer
His Attorney.

3,062,925

PHONOGRAPH PICKUP CARTRIDGE AND REPLACEABLE STYLUS THEREFOR

Peter Ernest Pritchard, Skaneateles, N.Y., assignor to General Electric Company, a corporation of New York Filed May 2, 1960, Ser. No. 26,019
18 Claims. (Cl. 179—100.41)

This invention relates to phonograph pickup cartridges, and more particularly to a magnetic phonograph pickup cartridge of the variable reluctance type and a replaceable stylus assembly therefor. The cartridge of the present invention can be used for playing both stereophonic and monaural records, and it is an improvement over the magnetic phonograph pickup cartridge disclosed in U.S. Patents No. 3,015,703, issued January 2, 1962, and No. 3,047,677, issued July 31, 1962, both by the same inventor and assigned to the same assignee as the present invention.

An object of the present invention is to provide an improved phonograph pickup cartridge having a replaceable stylus assembly.

Another object is to provide a phonograph pickup cartridge of the variable reluctance type having a replaceable stylus assembly, in which a stylus-carrying armature is accurately positioned and aligned with respect to a pair of magnet pole pieces.

A further object is to provide a replaceable stylus assembly for a magnetic phonograph pickup cartridge, which has improved stability, reliability, and performance characteristics.

Still other objects will be apparent from the following description and claims, and from the drawing in which:

Figure 1:
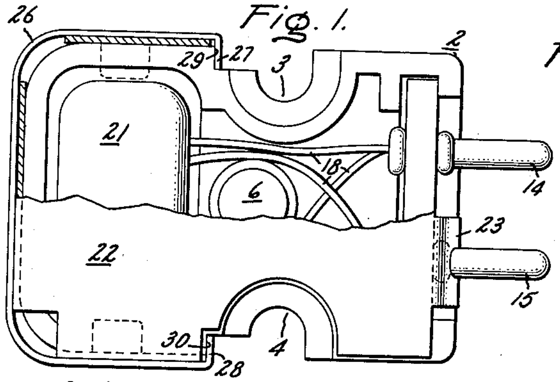
FIG. 1 is a top view of a preferred embodiment of the invention, shown partly broken away to reveal interior construction thereof.
Figure 2:
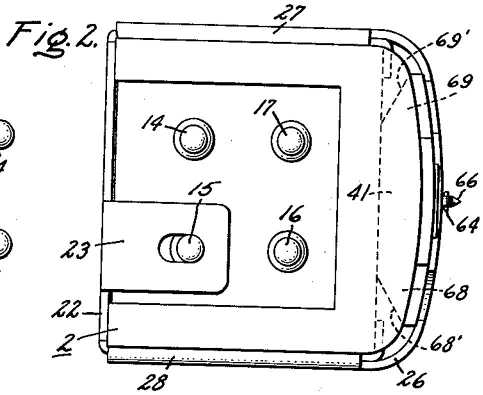
FIG. 2 is a view of the back end of the embodiment of FIG. 1.

The magnetic phonograph pickup cartridge of the invention comprises, in its preferred embodiment, a cartridge unit containing a permanent magnet and having a pair of coils provided with openings therein, and a replaceable stylus assembly comprising a body member having a pair of cores carried thereby and extending therefrom into the coil openings of the cartridge unit. The ends of these cores, at the body member of the stylus assembly, are shaped to provide spaced-apart pole pieces, and a stylus-carrying armature of magnetic material is supported by the body member in suitable alignment with the poles pieces. The body member is provided with an elongated slot in alignment with the space between the pole pieces, and the armature is shaped and positioned to have an elongated arm lying in the elongated slot, this arm being held in place in the slot by blocks of resilient material. A plate of magnetic material is carried by the body member of the stylus assembly, and its magnetic attraction to the aforesaid permanent magnet in the cartridge unit aids in maintaining the stylus assembly in position with respect to the cartridge unit. The body member is provided with extended portions in the vicinity of the poles pieces to increase its strength and to provide ease of handling of the stylus assembly.

Now referring to FIGS. 1 through 5 of the drawing, a phonograph pickup cartridge in accordance with the present invention includes a housing 2, which preferably may be of a suitable non-magnetic material such as molded plastic, and which is provided with attachment screw slots 3 and 4, or other means for attaching the housing 2 to a phonograph tone arm. A permanent magnet 6 is positioned in and supported by the housing 2, and is shown as having an elongated cylindrical shape arranged in a vertical or upright position with respect to the housing 2 as clearly illustrated in FIG. 3, the magnetic poles of the permanent magnet 6 being at the top and bottom ends thereof. A pair of coils 7 and 8 are positioned in and supported by the body 2, these coils 7 and 8 being positioned side by side in front of, and symmetrical with respect to, the magnet 6. The axes of the magnet 6 and coils 7 and 8, are mutually parallel. The coils 7 and 8 are provided with openings 9 and 10 therethrough, respectively, these openings being adapted for receiving magnetic cores 11 and 12 which are a part of the replaceable stylus assembly to be described more fully hereinafter. The cores 11 and 12, and the coil openings 9 and 10, may have square cross-sectional shapes as shown, or other suitable configurations. Coil forms 13 may be provided, if desired, to support the coils 7 and 8, and to provide the openings 9 and 10 therethrough. The ends of the windings of the coils 7 and 8 are respectively connected to terminal pins 14, 15, 16 and 17 at the rear of the housing 2, by means of wires 18.

A shielding member 21, made from magnetic material, such as iron, is positioned over and around the coils 7 and 8 within the housing 2. An additional magnetic shielding member 22 is positioned over the top and sides of the housing 2 in order to provide additional magnetic shielding for the coils 7 and 8, this magnetic shield 22 being provided with a tab 23 connected to one of the terminal pins 15 which is normally a common or electrically grounded connection. A cover member 26, made from magnetic material to provide additional magnetic shielding, is arranged to slide over the front portion of the body member 2 from the bottom thereof, and is provided with inwardly extending tabs 27 and 28 for engagement with vertical shoulders 29 and 30 of the housing 2. The housing 2 may be substantially hollow, as shown, and the unused space therein may be filled with wax or other suitable potting compound 32 to assist in holding the internal parts in position.

Figure 3:
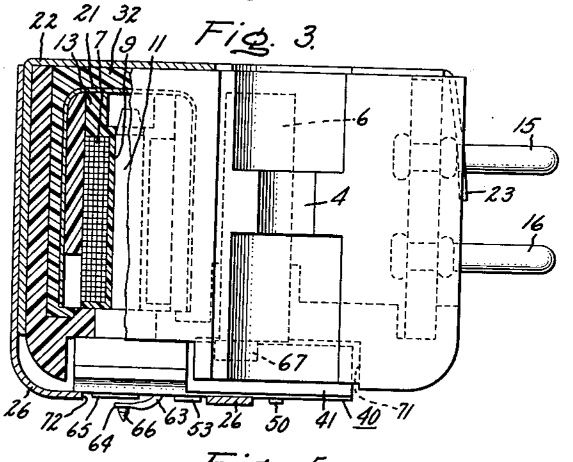
FIG. 3 is a side view of the preferred embodiment of the invention, shown partly broken away to reveal interior construction thereof.
Figure 4:
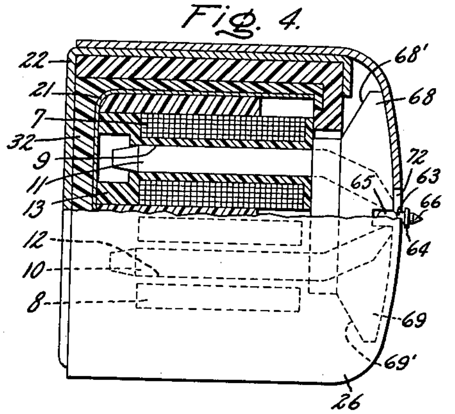
FIG. 4 is a front view of the preferred embodiment of the invention, shown partly broken away to reveal details of the interior construction thereof.
Figure 5:
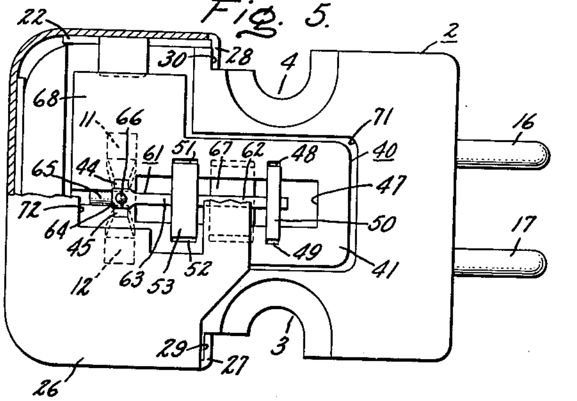
FIG. 5 is a view of the bottom of the preferred embodiment of the invention, shown partly broken away to reveal internal construction thereof.
Figure 6:
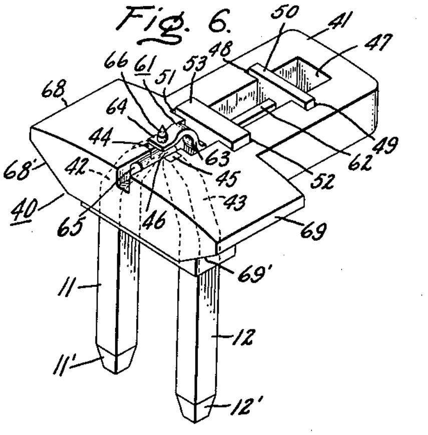
FIG. 6 is a perspective view of a replaceable stylus assembly in accordance with the invention.

A replaceable stylus assembly 40, shown best in FIGS. 3, 5 and 6, comprises a body member 41 preferably made from electrically insulative material such as plastic. Preferably, the body member 41 is molded around the cores 11 and 12, to provide an integral unit. Within the body member 41, the cores 11 and 12 are curved toward each other at 42 and 43, and the ends thereof are shaped to provide tapered pole pieces 44 and 45 spaced apart to provide a gap 46 therebetween. The magnetic cores 11 and 12 are attached to and supported by the body member 41 so that they extend mutually parallel therefrom. An elongated slot 47 is provided in the body member 41 behind and in alignment with the gap 46 between the pole pieces 44 and 45. A pair of notches 48, 49 are laterally disposed in the sides of the slot 47 and a first block 50 of resilient material is held by the notches 48 and 49 and extends across the slot 47. A second pair of notches 51, and 52 are laterally disposed in the sides of the slot 47, and a second block 53 of resilient material is held by the notches 51 and 52 and extends across the slot 47. Preferably, the first or rear block 50 is made from natural gum rubber, and the second or front block 53 is made from butyl rubber. The blocks 50 and 53 may be held in their respective slots by friction or by means of an adhesive. Each of the blocks 50 and 53 is provided with an opening therethrough substantially along the axis of the slot 47.

A crank-shaped armature 61 made from magnetically conductive material such as iron, has an elongated arm portion 62 extending through the openings in the blocks 50 and 53. The armature 61 further has a crank portion 63 extending in a lateral direction from the forward end of the elongated arm portion 62, and an end portion 64 extending forwardly from the crank portion 63, as shown, the end portion 64 thus being accurately held an optimum distance below the pole pieces 44 and 45 and in centered alignment with the gap 46. A stylus 66 adapted for engaging the groove of a phonograph record is attached to and extends laterally outwardly from the end portion 64. A block 65 of resilient material such as rubber may be positioned in the gap 46 to cushion the armature 61 and stylus 66 against excessive shock. The armature 61 preferably has a generally rectangular cross-sectional shape. A plate 67 of magnetic material is attached to the body member 41 at the top side thereof and extends across the slot 47. The body member 41 is provided with a pair of projections 68 and 69 extending laterally in opposite directions therefrom in the vicinity of the cores 11 and 12, thereby providing finger grips to facilitate the insertion and removal of the stylus assembly into and from the cartridge unit and also providing additional strength at the region where the cores 11 and 12, and the curved portions 42 and 43 thereof, are embedded in the body member 41. The ends of these projections 68 and 69 are bevelled at the upper sides thereof, as indicated at 68′ and 69′, to facilitate manual gripping thereof.

The underside of the cartridge housing 2 is provided with a T-shaped recess 71 adapted for receiving the T-shaped body member 41 of the stylus assembly. The recess 71 exposes the openings 9 and 10 of the coils 7 and 8, whereby the stylus assembly 40 may be attached to the cartridge unit by inserting the cores 11 and 12 into the openings 9 and 10, respectively. The free ends of the cores 11 and 12 are bevelled, as indicated at 11′ and 12′, to facilitate their insertion into the openings 9 and 10. The body member 41 fits partially into the recess 71 with the stylus assembly 40 in place, and the cores 11 and 12 extend through the coils 7 and 8 whereby these coils are respectively magnetically coupled to the cores 11 and 12. The magnetic plate 67 is in the vicinity of the lower pole of the magnet 6, whereby the magnet 6 tends to attract the plate 67, thereby holding the stylus assembly 40 in place with respect to the cartridge unit.

After the stylus assembly 40 is in place, the cover 26 is attached by sliding it upwardly over the front portion of the housing 2, whereby the cover 26 substantially covers the underside of the stylus assembly 40, thereby protecting it and providing magnetic shielding therefor. The cover member 26 is provided with a suitable opening 72 through which the stylus 66 and the front part 64 of the armature 61 project downwardly.

The magnet 6, the magnetic plate 67, the armature 61, and the cores 11 and 12 along with their associated pole pieces 44 and 45, form a magnetic circuit in which (with suitable magnetic polarization of the magnet 6), magnetic flux generated by the magnet 6 extends downwardly through the magnetic plate 67, then through space to the armature 61, and lengthwise through the armature 61 to the front portion 64 thereof at which the stylus 66 is located. The magnetic flux then separates into two portions, one portion going through space to the pole piece 44 and inducing a magnetic charge in the core 11.

The other portion of the magnetic flux from the front end 64 of the armature 61 extends through space to the pole piece 45, and induces a magnetic charge in the core 12.

An opposite polarization of the magnet 6 will cause the aforesaid directions of magnetic flux to be reversed; the functioning will be the same regardless of the polarization of the magnet 6.

In effect, two parallel magnetic circuits are provided through the cores 11 and 12 by the flux distribution described above. A change in the magnetic reluctance of the path of the magnetic flux which goes through either or both of the cores 11 and 12, will cause generation of corresponding electrical signals in either or both of the coils 7 and 8, in a well known manner. Movement of the armature 61, caused by the stylus 66 being in engagement with the modulated groove of a moving phonograph record, will cause a change in the reluctance of one or both of the magnetic paths through the cores 11 and 12, and their associated pole pieces 44, 45 thereby producing the aforesaid electrical signals in the coils 7 and 8.

If the phonograph pickup cartridge is used to play a stereophonic record of the type in which the recorded groove thereof has sidewalls respectively arranged at 45 degree angles with respect to the vertical, each of these sidewalls being recorded with individual channels of a stereophonic signal, the stylus 61 will move with respect to the pole pieces 44 and 45 in such a manner as to cause the generation of signals in the coils 7 and 8 corresponding respectively to the individual modulations of the two sidewalls of the record groove. If desired, the pickup cartridge may be used for playing a monaural type of phonograph record, in which case the armature 61 will be vibrated in a horizontal direction by the recorded groove of the record. This causes equal signals, of opposite polarity, to be generated in the coils 7 and 8. By properly connecting these coils in series, the output signal of the cartridge will be the sum of the signals generated in the two coils 7 and 8 and hence will represent the monaural modulation of the record groove.

Further details of the operation of this type of phonograph pickup cartridge are given in the aforementioned. Proper operation, especially for stereophonic use, requires accurate positioning of the front portion 64 of the armature 61 beneath and centered with respect to, the gap 46 provided between the pole pieces 44 and 45.

It has been found that the above described construction of a phonograph cartridge and replaceable stylus assembly, achieve the objectives of the invention. The critical positioning of the front portion 64 of the armature 61 with respect to the pole pieces 44 and 45 may be accurately achieved in the manufacture of the stylus assembly because the pole pieces 44 and 45 are included as a part thereof along with the armature 61. Thus, proper function of the cartridge and its stylus assembly is assured, both initially and during the life of the stylus 66. When the stylus 66 becomes worn, and the stylus assembly 40 is replaced with a new one, proper positioning of the armature 61 with respect to the pole pieces 44 and 45 is inherent without the need for making critical adjustments.

While a preferred embodiment of the invention has been shown and described, other embodiments and modifications thereof will be apparent to those skilled in the art, and will fall within the scope of invention as defined in the following claims.

What I claim is:

1. A phonograph pickup cartridge comprising a cartride unit containing a coil provided with an opening therein, and a replaceable stylus assembly arranged to be removably attached to said cartridge unit and comprising a core adapted to extend into the opening of said coil when said stylus assembly is attached to said cartridge unit.

2. A phonograph pickup cartridge comprising a cartridge unit containing a pair of coils each provided with an opening therein, and a replaceable stylus assembly arranged to be removably attached to said cartridge unit and comprising a pair of cores adapted to extend respectively into the openings of said coils when said stylus assembly is attached to said cartridge unit, an armature positioned in spaced relationship with respect to said cores, and a stylus attached to said armature and adapted for engaging the groove of a phonograph record.

3. A phonograph pickup cartridge comprising a cartridge unit containing at least one coil provided with an opening therein, and a replaceable stylus assembly arranged to be removably attached to said cartridge unit and comprising at least one core adapted to extend respectively into the opening of said coil when said stylus assembly is attached to said cartridge unit, an armature positioned in spaced relationship with respect to said cores, and a stylus attached to said armature and adapted for engaging the groove of a phonograph record.

4. A phonograph pickup cartridge comprising a cartridge unit containing an elongated permanent magnet and a pair of elongated coils positioned in front of said magnet, the axes of said magnet and coils being substantially mutually parallel, each of said coils being provided with an elongated opening extending axially therein, and a replaceable stylus assembly comprising a body member, a pair of elongated cores of magnetic material carried by said body member and extended mutually parallel therefrom and adapted to extend respectively into the openings of said coils, said cores being provided with spaced apart pole pieces at said body member, and an armature carried by said body member and spaced from said pole pieces, said armature being provided with a stylus adapted for engaging the groove of a phonograph record.

5. A phonograph pickup cartridge comprising a cartridge unit containing an elongated permanent magnet and a pair of elongated coils positioned in front of said magnet, the axes of said magnet and coils being substantially mutually parallel, each of said coils being provided with an elongated opening extending axially therein, and a replaceable stylus assembly comprising a body member, a pair of elongated cores of magnetic material carried by said body member and extending mutually parallel therefrom and adapted to extend respectively into the openings of said coils, said cores being curved toward one another to provide spaced apart pole pieces having a gap therebetween at said body member, said body member being provided with an elongated slot behind and in axial alignment with said gap, an elongated armature of magnetic material having a portion thereof positioned in said slot and held therein by resilient means, said armature having an end portion thereof extending beneath said gap, and a stylus attached to and extending outwardly from said end portion of the armature.

6. A phonograph pickup cartridge comprising a hollow housing having a T-shaped recess in the bottom thereof, the head of said T-shaped recess extending laterally across said housing near the front end thereof, a pair of coils positioned laterally in said housing above said head of the T-shaped recess, each of said coils being provided with an opening extending vertically therein, the wall of said housing being open at said head of the T-shaped recess to expose said coil openings, a magnet positioned in said housing above the stem of said T-shaped recess, and a replaceable stylus assembly comprising a T-shaped body member adapted to fit at least partially into said T-shaped recess, a pair of elongated cores of magnetic material carried by said body member and extending mutually parallel therefrom at the top side of the head of said T-shaped body member and being adapted to extend respectively into the openings of said coils, said cores being shaped to provide spaced apart pole pieces having a gap therebetween at the underside of said body member near the juncture of the head and stem thereof, said stem of the T-shaped body member being provided with a slot therein in axial alignment with said gap, an elongated armature of magnetic material having a portion thereof positioned in said slot and held therein by resilient means, said armature having an end portion thereof extending beneath said gap, and a stylus attached to and extending outwardly from said end portion of the armature.

7. A phonograph pickup cartridge as claimed in claim 6, including a plate of magnetic material attached to the upper side of said body member of the stylus assembly and extending across said slot in the vicinity of the lower end of said magnet when said stylus assembly is positioned in said T-shaped recess.

8. A phonograph pickup cartridge comprising a cartridge unit containing a magnet and having at least one coil provided with an opening therein, and a replaceable stylus assembly comprising a body member, at least one core carried by said body member, said core being adapted to extend respectively into the opening of said coil, an armature of magnetic material carried by said body member and positioned in spaced relationship with respect to said core, a stylus attached to said armature for engaging the groove of a phonograph record, and a plate of magnetic material carried by said body member and located thereon so as to be attracted by said magnet.

9. A stylus assembly for use in a phonograph pickup cartridge, comprising a body member, at least one core of magnetic material attached to said body member and extending therefrom, an armature carried by said body member and positioned in spaced relationship with respect to said core, and a stylus attached to and extending from said armature.

10. A stylus assembly for use in a phonograph pickup cartridge, comprising a body member, a pair of elongated cores of magnetic material attached to and extending through said body member, said cores extending mutually parallel from one side of said body member and being shaped to provide spaced apart pole pieces at the opposite side of said body member, an armature carried by said body member and positioned in spaced relationship with respect to said pole pieces, and a stylus attached to and extending from said armature.

11. A stylus assembly for use in a phonograph pickup cartridge, comprising a body member, a pair of elongated cores of magnetic material attached to and extending through said body member, said cores extending mutually parallel from the top side of said body member and curving toward each other within said body member to provide spaced apart pole pieces having a gap therebetween at the bottom side of said body member, said body member being provided with an elongated slot behind and in alignment with said gap, an elongated armature of magnetic material having a portion thereof positioned in said slot and held therein by resilient means, said armature having an end portion thereof extending beneath said gap, and a stylus attached to and extending outwardly from said end portion of the armature.

12. A stylus assembly for use in a phonograph pickup cartridge, comprising a body member, a pair of elongated cores of magnetic material attached to and extending through said body member, said cores extending mutually parallel from the top side of said body member and curving toward each other within said body member to provide spaced apart pole pieces having a gap therebetween at the bottom side of said body member, said body member being provided with an elongated slot behind and in alignment with said gap, at least one block of resilient material held in said slot and extending laterally thereacross, an elongated armature of magnetic material having an elongated portion thereof positioned in said slot and extending through said block of resilient material, said armature having an end portion thereof extending beneath said gap, and a stylus attached to and extending outwardly from said end portion of the armature.

13. A stylus assembly for use in a phonograph pickup cartridge, comprising a body member, a pair of elongated cores of magnetic material attached to and extending through said body member, said cores extending mutually parallel from the top side of said body member and curving toward each other within said body member to provide spaced apart pole pieces having a gap therebetween at the bottom side of said body member, said body member being provided with an elongated slot behind and in alignment with said gap, at least one pair of notches laterally disposed in opposite sidewalls of said slot, at least one block of resilient material, said block of resilient material being respectively held in said pair of notches so as to extend laterally across said slot, an elongated armature of magnetic material having an elongated portion thereof positioned in said slot and extending through said block of resilient material, said armature having an end portion thereof extending beneath said gap, and a stylus attached to and extending outwardly from said end portion of the armature.

14. A stylus assembly for use in a phonograph pickup cartridge, comprising a T-shaped body member having a head portion and a stem portion, a pair of elongated cores of magnetic material attached to and extending through said head portion of the body member, said cores extending mutually parallel from the top side of said head portion and curving toward each other within said head portion to provide spaced apart pole pieces having a gap therebetween at the bottom side of said head portion, said gap being in alignment with the axis of said stem portion of the body member, said stem portion being provided with an elongated slot therein in alignment with said gap, an elongated armature of magnetic material having a portion thereof positioned in said slot and held therein by resilient means, said armature having an end portion thereof extending beneath said gap, and a stylus attached to and extending outwardly from said end portion of the armature.

15. A stylus assembly for use in a phonograph pickup cartridge, comprising a T-shaped body member having a head portion and a stem portion, a pair of elongated cores of magnetic material attached to and extending through said head portion of the body member, said cores extending mutually parallel from the top side of said head portion and curving toward each other within said head portion to provide spaced apart pole pieces having a gap therebetween at the bottom side of said head portion, said gap being in alignment with the axis of said stem portion of the body member, said stem portion being provided with an elongated slot therein in alignment with said gap, at least one block of resilient material held in said slot and extending laterally thereacross, an elongated armature of magnetic material having an elongated portion thereof positioned in said slot and extending through said block of resilient material, said armature having an end portion thereof extending beneath said gap, and a stylus attached to and extending outwardly from said end portion of the armature.

16. A stylus assembly for use in a phonograph pickup cartridge, comprising a T-shaped body member having a head portion and a stem portion, a pair of elongated cores of magnetic material attached to and extending through said head portion of the body member, said cores extending mutually parallel from the top side of said head portion and curving toward each other within said head portion to provide spaced apart pole pieces having a gap therebetween at the bottom side of said head portion, said gap being in alignment with the axis of said stem portion of the body member, said stem portion being provided with an elongated slot therein in alignment with said gap, at least one pair of notches laterally disposed in opposite sidewalls of said slot, at least one block of resilient material, said block of resilient material being respectively held in said pair of notches so as to extend laterally across said slot, and an elongated armature of magnetic material having an elongated portion thereof positioned in said slot and extending through said block of resilient material, said armature having an end portion thereof extending beneath said gap, and a stylus attached to and extending outwardly from said end portion of the armature.

17. A stylus assembly for use in a phonograph pickup cartridge comprising a body member, at least one core of magnetic material attached to said body member and extending therefrom at the top side thereof, an elongated armature of magnetic material carried by said body member and having a portion thereof extending below said core at the bottom side of said body member, a stylus attached to and extending outwardly from said portion of the armature, and a plate of magnetic material attached to said body member at said top side thereof and spaced from said armature.

18. A stylus assembly for use in a phonograph pickup cartridge, comprising a body member, a pair of elongated cores of magnetic material attached to and extending through said body member, said cores extending mutually parallel from the top side of said body member and curving toward each other within said body member to provide spaced apart pole pieces having a gap therebetween at the bottom side of said body member, said body member being provided with an elongated slot behind and in alignment with said gap, an elongated armature of magnetic material having a portion thereof positioned in said slot and held therein by resilient means, said armature having an end portion thereof extending beneath said gap, a stylus attached to and extending outwardly from said end portion of the armature, and a plate of magnetic material attached to said body member at the top side thereof and extending across said slot.

No references cited.